(12) United States Patent
Masuda

(10) Patent No.: US 7,306,123 B2
(45) Date of Patent: Dec. 11, 2007

(54) FLUID DISCHARGE PUMP AND FLUID CONTAINER

(76) Inventor: Masatoshi Masuda, 2,9-banchi, Takada-Cho, Saiin, Ukyo-ku, Kyoto-city, Kyoto 615-0031 (JP)

( * ) Notice: Subject to any disclaimer, the term of this patent is extended or adjusted under 35 U.S.C. 154(b) by 247 days.

(21) Appl. No.: 10/872,021

(22) Filed: Jun. 18, 2004

(65) Prior Publication Data

US 2005/0000985 A1 Jan. 6, 2005

(30) Foreign Application Priority Data

Jul. 3, 2003 (JP) .............................. 2003-191197

(51) Int. Cl.
*B67D 5/42* (2006.01)
*G01F 11/00* (2006.01)

(52) U.S. Cl. .................. 222/386; 222/207; 222/256

(58) Field of Classification Search ................ 222/256, 222/257, 258, 321.2, 321.6, 321.7–321.9, 222/386–393, 207
See application file for complete search history.

(56) References Cited

U.S. PATENT DOCUMENTS

| 31,408 A | * | 2/1861 | Czech ........................ 241/89.1 |
| 4,030,643 A | | 6/1977 | van Manen |
| 4,438,871 A | * | 3/1984 | Eckert .......................... 222/137 |
| 4,913,322 A | * | 4/1990 | Stoffler et al. ............... 222/207 |
| 5,000,355 A | * | 3/1991 | Pritchard ..................... 222/256 |
| 5,052,592 A | * | 10/1991 | Wilken et al. ............... 222/212 |
| 5,377,880 A | * | 1/1995 | Moretti ........................ 222/207 |
| 5,673,821 A | * | 10/1997 | Davis et al. ................. 222/137 |
| 5,697,531 A | | 12/1997 | Fattori |
| 5,738,067 A | * | 4/1998 | Landwehr et al. ........... 132/320 |
| 5,819,990 A | * | 10/1998 | Cimentepe et al. ......... 222/207 |
| 5,823,394 A | * | 10/1998 | Davis et al. ................. 222/137 |
| 2002/0166876 A1 | | 11/2002 | Masuda |
| 2003/0230600 A1 | | 12/2003 | Masuda |

FOREIGN PATENT DOCUMENTS

| DE | 299 16 779 U1 | | 2/2001 |
| EP | 0276983 | * | 3/1988 |
| EP | 0276983 A2 | * | 3/1988 |
| JP | 08-280804 | | 10/1996 |

* cited by examiner

*Primary Examiner*—Kevin Shaver
*Assistant Examiner*—Stephanie E. Tyler
(74) *Attorney, Agent, or Firm*—Knobbe, Martens Olson & Bear LLP

(57) ABSTRACT

A piston adapted to be engaged inside a cylindrical container is constituted by an elastic member and includes: a sliding member having an upper fluidtight portion and a lower fluidtight portion, both of which fluidtightly and slidably contact an inner wall of the cylindrical container; and a support member having an upper concentric flexion and a lower concentric flexion to urge the sliding member against the inner wall of the cylindrical container.

25 Claims, 18 Drawing Sheets

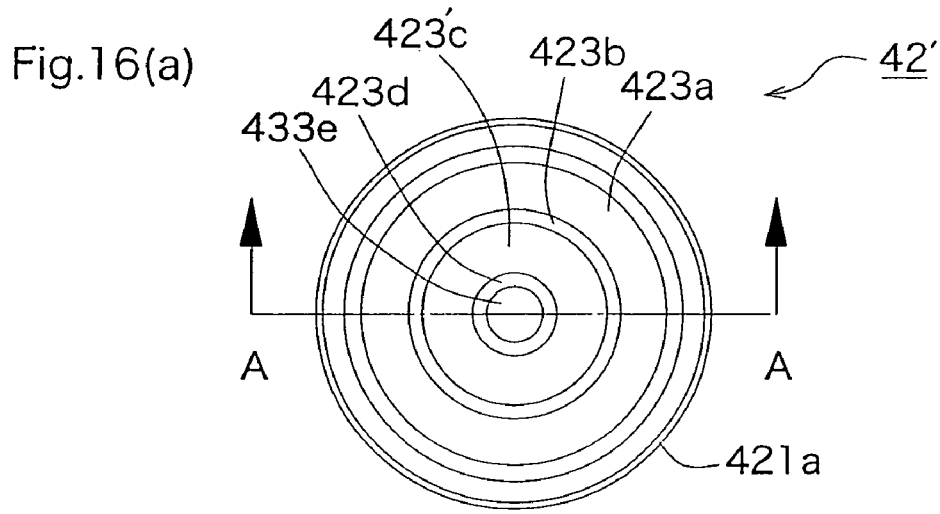
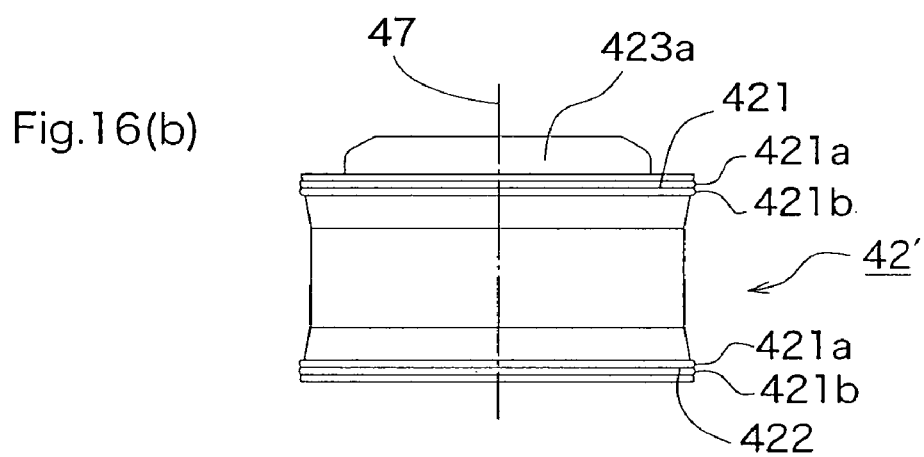
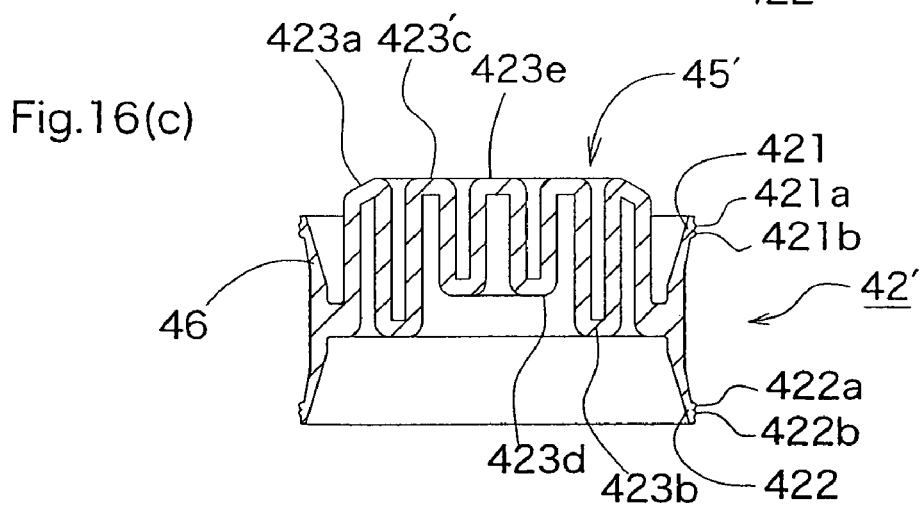

US 7,306,123 B2

FLUID DISCHARGE PUMP AND FLUID CONTAINER

This is a U.S. patent application claiming foreign priority under 35 U.S.C. § 119 to Japanese Patent Application No. 2003-191197, filed Jul. 3, 2003, the disclosure of which is herein incorporated by reference in their entirety.

BACKGROUND OF THE INVENTION

This invention relates generally to a piston engaged inside a cylindrical container, which serves as a movable bottom of the container and functions for enhancing fluidtightness inside the container.

As a piston for enhancing airtightness inside a cylinder, Japanese Patent Laid-open No. 1996-280804 discloses a piston for a syringe, for example. However, a cylinder produced by injection molding, for example, often has a tapered inner wall for production process convenience, and in that case, the conventional piston could not maintain fulidtightness because an internal diameter of the cylinder changes whereas the diameter of the piston does not significantly change. Further, the conventional piston is normally designed for short term use, and the seal between the piston and the inner wall tends to be degraded with time.

SUMMARY OF THE INVENTION

In view of the above, the present invention has been achieved. In an aspect, an object of the present invention is to provide a piston capable of securing fluidtightness, and a fluid container using the same. Another object of the present invention is to provide a piston usable for a tapered cylindrical container. Still another object of the present invention is to provide a piston capable of maintaining high fluidtightness for a long period of time. Yet another object of the present invention is to provide a piston having a simple structure which achieves at least one of the above objects.

The present invention is not intended to be limited by the above objects, and various objects other than the above can be accomplished as readily understood by one of ordinary skill in the art. The embodiments described below use reference numbers used in the drawings solely for easy understanding, and the reference numbers are not intended to limit the scope of the invention.

In an embodiment, the present invention provides a piston (e.g., 42, 42') adapted to be engaged inside a cylindrical container (e.g., 40, 40'), constituted by an elastic member comprising: (i) a sliding member (e.g., 46) having an upper fluidtight portion (e.g., 421) and a lower fluidtight portion (e.g., 422), both of which fluidtightly and slidably contact an inner wall (e.g., 30, 30') of the cylindrical container; and (ii) a support member (e.g., 45, 45') having an upper concentric flexion (e.g., 423a) and a lower concentric flexion (e.g., 423b) to urge the sliding member against the inner wall of the cylindrical container.

The above embodiment includes, but is not limited to, the following embodiments.

The lower concentric flexion (e.g., 423b) may be disposed nearly half way between the upper fluidtight portion (e.g., 421) and the lower fluidtight portion (e.g., 422). The upper concentric flexion (e.g., 423a) may be disposed above the upper fluidtight portion. Each of the upper and lower concentric flexions may be disposed on a plane perpendicular to an axis (e.g., 47) of the piston. The support member may further have at least another concentric flexion (e.g., 423c, 423'c, 423d). The other concentric flexion may be arranged on a plane perpendicular to an axis (e.g., 47) of the piston between a plane on which the upper concentric flexion (e.g., 423a) is disposed and a plane on which the lower concentric flexion (e.g., 423b) is disposed. The upper and lower fluidtight portions (e.g., 421, 422) each may be constituted by at least one annular convex portion (e.g., 421a, 421b, 422a, 422b) (each fluidtight portion may include two or three annular convex portions).

In another aspect, the present invention provides a fluid container (e.g., 40) comprising: (a) a fluid-storing portion (e.g., 41, 41') for storing a fluid therein; (b) any one of the piston (e.g., 42, 42') of the foregoing engaged inside the fluid-storing portion, said piston serving as a bottom of the fluid-storing portion; (c) a nozzle head (e.g., 20) for discharging the fluid disposed on an upper side of the fluid-storing portion; and (d) a fluid discharge pump (e.g., 10) for discharging the fluid stored inside the fluid-storing portion from the nozzle head when the nozzle head is pressed.

The above embodiment includes, but is not limited to, the following embodiments.

The fluid-storing portion (e.g., 40) may be cylindrical and has an inner wall (e.g., 30) tapered toward the nozzle head (e.g., 20). The gradient of the tapered wall may be in the range of about 0° to about 10°, preferably more than about 0° but less than about 7°, more preferably about 1° to about 5°. Within the above ranges, the inner wall can have uneven surfaces.

The piston may have at least another concentric flexion (e.g., 423d), said other concentric flexion being arranged inward of the upper concentric flexion (e.g., 423a) and the lower concentric flexion (e.g., 423b) with respect to an axis (e.g., 47) of the piston and between the upper concentric flexion (e.g., 423a) and the lower concentric flexion (e.g., 423b) with respect to respective planes perpendicular to the axis of the piston. The lower concentric flexion (e.g., 423b) may be arranged nearly half way between the upper and lower fluidtight portions (e.g., 421, 422). The upper concentric flexion (e.g., 423a) may be arranged above the upper fluidtight portion (e.g., 421).

In another embodiment, the present invention provides a piston (e.g., 42, 42') adapted to be engaged inside a cylindrical container (e.g., 40, 40'), constituted by an elastic member comprising: (i) a sliding member (e.g., 46) having an upper fluidtight portion (e.g., 421) and a lower fluidtight portion (e.g., 422), both of which fluidtightly and slidably contact an inner wall (e.g., 30, 30') of the cylindrical container; and (ii) a support member (e.g., 45, 45') having an upper flexion (e.g., 423a) and a lower flexion (e.g., 423b) to urge the sliding member against the inner wall of the cylindrical container, each of the upper and lower flexions being disposed on a plane perpendicular to an axis (e.g., 47) of the piston.

The above embodiment includes, but is not limited to, the following embodiments.

A cross section of the cylindrical container, the upper flexion, and the lower flexion may have homologous shapes on a plane perpendicular to the axis. The homologous shapes mean that the shapes are nearly the same but different in size. The cylindrical container may have a cross section perpendicular to the axis which is not only a circle but also an oval or any other shape having no sharp inflection point in cross section.

In the above, a distance between the upper flexion (e.g., 423a) and the axis (e.g., 47) may be greater than a distance between the lower flexion (e.g., 423b) and the axis (e.g., 47). The lower flexion (e.g., 423b) may be disposed nearly half way between the upper fluidtight portion (e.g., 421) and the lower fluidtight portion (e.g., 422). The upper flexion (e.g., 423*a*) may be disposed above the upper fluidtight portion (e.g., 421). The support member further may have at least another homologous flexion (e.g., 423*c*, 423'*c*, 423*d*) inward of the upper and lower flexions (e.g., 423*a*, 423*b*). The other flexion (e.g., 423*d*) may be arranged between the upper flexion (e.g., 423*a*) and the lower flexion (e.g., 423*b*) with respect to respective planes perpendicular to the axis (e.g., 47). The upper and lower fluidtight portions (e.g., 421, 422) each may be constituted by at least one annular convex portion (e.g., 421*a*, 421*b*, 422*a*, 422*b*).

In still another embodiment, the present invention provides a fluid container (e.g., 40, 40') comprising: (a) a fluid-storing portion (e.g., 41, 41') for storing a fluid therein; (b) any one of the piston (e.g., 42, 42') of the foregoing engaged inside the fluid-storing portion, said piston serving as a bottom of the fluid-storing portion; (c) a nozzle head (e.g., 20) for discharging the fluid disposed on an upper side of the fluid-storing portion; and (d) a fluid discharge pump (e.g., 10) for discharging the fluid stored inside the fluid-storing portion from the nozzle head when the nozzle head is pressed.

The above embodiment includes, but is not limited to, the following embodiments.

The fluid-storing portion may be cylindrical and has an inner wall (e.g., 30) tapered toward the nozzle head. The gradient of the tapered wall may be in the range described above.

The piston may have at least another flexion (e.g., 423*d*), said other flexion (e.g., 423*d*) being arranged inward of the upper and lower flexions (e.g., 423*a*, 423*b*) with respect to an axis (e.g., 47) of the piston and between the upper and lower flexions (e.g., 423*a*, 423*b*) with respect to respective planes perpendicular to the axis (e.g., 47) of the piston. The lower flexion (e.g., 423*b*) may be arranged nearly half way between the upper and lower fluidtight portions (e.g., 421, 422). The upper flexion (e.g., 423*a*) may be arranged above the upper fluidtight portion (e.g., 421).

The sliding member and the supporting member may preferably be configured to provide at least 4% elastic deformation evenly in a radial direction (including about 5%-about 10%), although an elastic deformation may range from about 3% to about 30% in an embodiment. The flexions and the material enable the above, so that the piston can fit in a cylindrical container having a different inner diameter, a different shape, an uneven inner wall, an slanted inner wall, etc., without degrading fluidtightness between the piston and the inner wall of the cylindrical container from the bottom position to the top position of the piston in the cylindrical container. The sliding member may basically have an outer periphery corresponding to the inner cross section of the cylindrical container, which has a larger diameter than the maximum diameter of the cylindrical container in accordance with the degree of elastic deformation of the piston and the shape of the inner wall of the cylindrical container.

The piston may be constituted by any suitable material such as a resin, rubber, composite, etc. Preferably, the piston may be constituted by a resin such as polypropylene or polyethylene, a resin containing a rubber material such as silicon rubber, a mixture of the foregoing, and the like. Hardness of the material can be adjusted by adjusting a ratio of a hard resin to a soft resin. Further, in the present invention, all of the elements can be made of a resin, rubber, composite, or mixture thereof, and the hardness and elasticity of each can be adjusted depending on the function required for the element. For example, a bending or flexing portion (e.g., a valve body) can be made of a more flexible material than the other portions (e.g., a valve seat).

In the present invention, the flexion may be an elbow having an acute angle or a point of turning in a cross section along the axis. Each flexion may be on a plane perpendicular to the axis. The flexions may be comprised of at least one upper flexion and one lower flexion; e.g., from the outer periphery to the center, (I) an upper flexion and an lower flexion, (II) a first upper flexion, a lower flexion, and a second upper flexion, (III) a first lower flexion, an upper flexion, and a second lower flexion, etc. In a preferable embodiment, the plane perpendicular to the axis on which the second lower flexion is arranged is closer to the upper fluidtight portion than is the plane on which the first lower flexion is arranged, so that the piston can smoothly travel upward without degrading fluidtightness as the fluid inside is used. For the same reason, as described above, in a preferable embodiment, the plane on which the first lower flexion is arranged is nearly half way between the upper fluidtight portion and the lower fluidtight portion.

In all of the foregoing embodiments, any element used in an embodiment can interchangeably be used in another embodiment, and any combination of elements can be applied in these embodiments, unless it is not feasible.

For purposes of summarizing the invention and the advantages achieved over the related art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

FIGS. 16(a)-(c) are a top view, side view, and cross sectional view of A-A line, respectively, showing the piston member 42' in an alternative embodiment.

Explanation of symbols used is as follows: 10: Fluid discharge pump; 11: Inflow valve mechanism; 12: Outflow valve mechanism; 16: Bellows member; 16a: Inflow opening; 16b: Outflow opening; 17: Packing; 20: Nozzle head; 21: Tubular member; 22: Guiding member; 40: Fluid-storing portion; 41: Cylinder member; 42: Piston member; 43: Inner lid; 43a: Air vent; 43b: Upper side of the bottom; 44: Outer lid; 44a: Hole; 111: Inflow valve seat member; 111a: Opening portion; 111b: Joined portion; 112: Inflow valve member; 112a: Valve body; 112b: Supporting portion; 112c: Coupling portion; 121: Outflow valve seat member; 121a: Opening portion; 121b: Joined portion; 121c: Inflow portion; 122: Outflow valve member; 122a: Valve body; 122b: Base portion; 211: Inflow portion; 212: Outflow portion; 213: Convex portion; 214: Engaging portion; 215: Knob portion; 221: Pushing portion; 222: Opening portion; 223: Guiding portion; 223a: First regulating portion; 223b: Second regulating portion; 224: Groove portion; 421: Fluidtight portion; 421a: Convex portion; 421b: Convex portion; 422: Fluidtight portion; 422a: Convex portion; 422b: Convex portion; 423: 423: Flexion.

DETAILED DESCRIPTION OF THE PREFERRED EMBODIMENT

As explained above, the present invention can be accomplished in various ways including, but not limited to, the foregoing embodiments. The present invention will be explained in detail with reference to the drawings, but the present invention should not be limited thereto.

Figure 1:
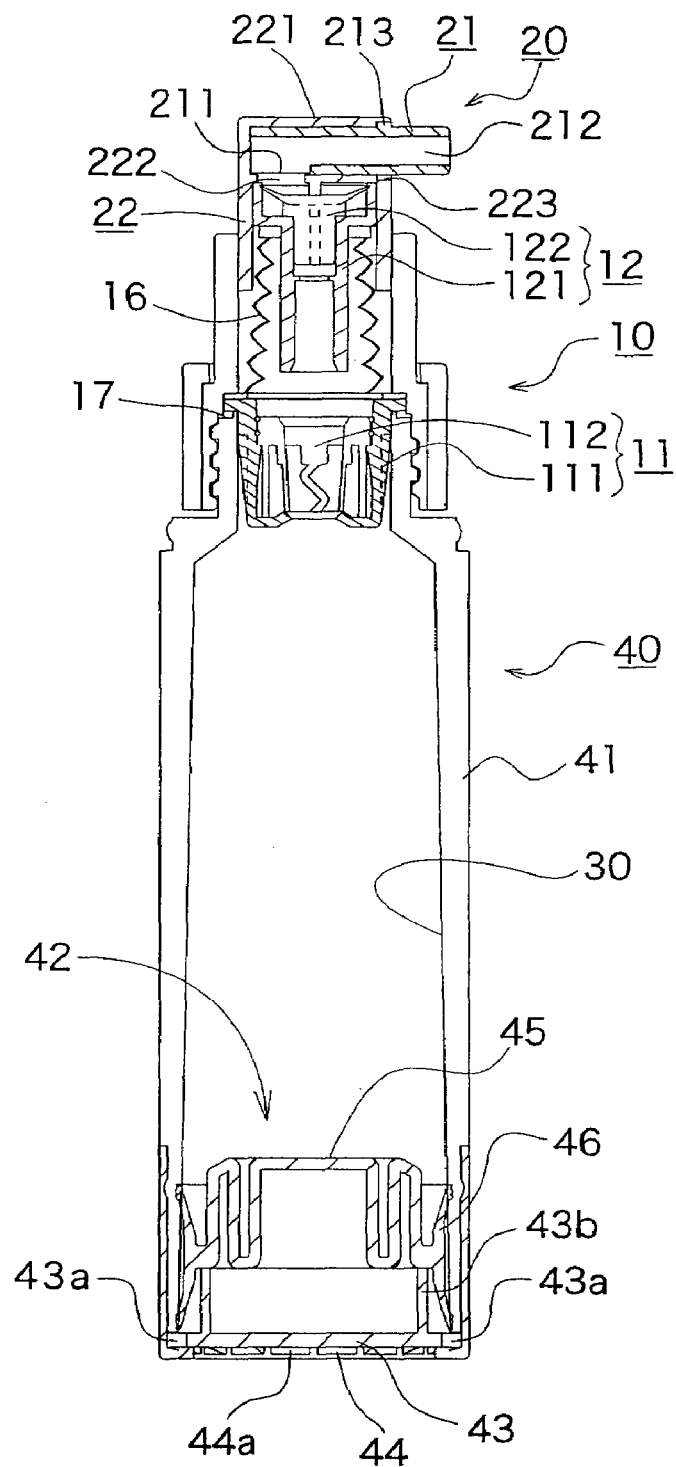
FIG. 1 is a longitudinal view of a fluid container according to Embodiment 1 of the present invention, where a piston is at the bottom of the container.
Figure 2:
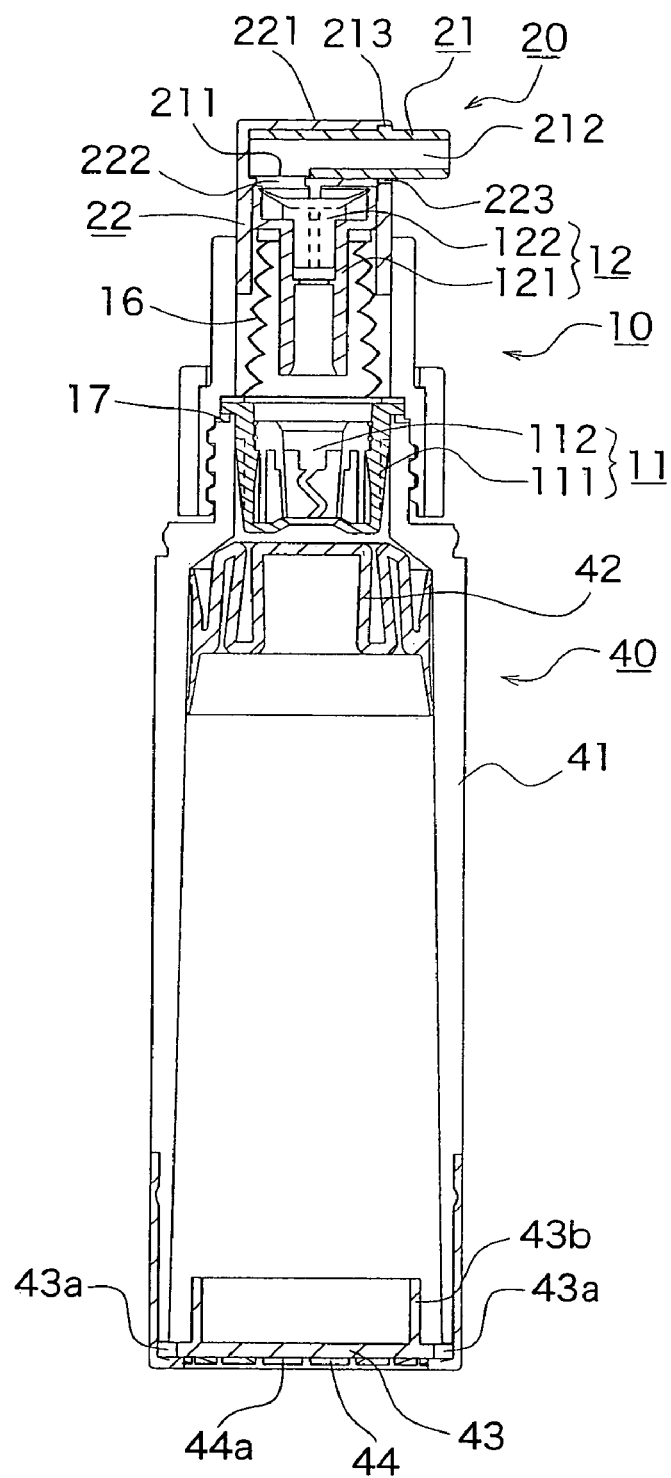
FIG. 2 is a longitudinal view of the fluid container according to Embodiment 1 of the present invention, wherein the piston is at the top of the container.

Preferred embodiments of the present invention are described by reference to drawings. FIGS. 1 to 2 are longitudinal cross-sections of the fluid container according to an embodiment of the present invention.

This fluid container may be used as a container for beauty products for storing gels such as hair gels and cleansing gels, creams such as nourishing creams and cold creams or liquids such as skin lotions used in the cosmetic field. Additionally, this fluid container also can be used as a container for medicines, solvents or foods, etc. In this specification, high-viscosity liquids, semifluids, gels that sol solidifies to a jelly, and creams and regular liquids are all referred to as fluids. Preferably, the fluid is a flowable or dischargable substance including a liquid phase, a liquid and solid mixed phase, a solid and gas mixed phase, a liquid, solid, and gas mixed phase when being stored in the container. Preferably, fluidtightness is liquidtightness.

The fluid container according to an embodiment of the present invention comprises a fluid pump 10, a nozzle head 20 switchable between an open position enabling a fluid to pass through between inside and outside the fluid container and a closed position shutting off passage of the fluid, and a fluid-storing portion storing the fluid therein.

Additionally, in this specification, upward and downward directions in FIGS. 1 and 2 are defined as upward and downward directions in the fluid container. In other words, in the fluid container according to the embodiment of the present invention, the side of the nozzle head 20 shown in FIG. 1 is defined as the upward direction; the side of a piston member 42 is defined as the downward direction.

The fluid-storing portion 40 has a tubelike cylinder member 41, a piston member traveling inside the cylinder member 41 up and down, an inner lid 43 in which multiple air vents 43a are formed, and an outer lid 44. The cylinder member 41 in the fluid-storing portion 40 and the fluid discharge pump 10 are connected fluidtightly via packing 17. Additionally, if an inflow valve mechanism 11 connected with the cylinder member of the fluid discharge pump 10 is adequately elastic, the packing 17 can be omitted.

The outer lid 44 is attached to the lower portion of the cylinder member 41 in a position in which the outer lid 44 holding the inner lid 43 between the outer lid 44 and the lower portion of the cylinder member 41. In the inner lid 43, the upper side of the bottom 43b for positioning the tail end of the piston member 42 inside the fluid-storing container is formed. By changing a height of this upper side of the bottom 43b, a storable fluid amount inside the fluid-storing container can be changed.

Additionally, a hole 44a is formed in the central portion of the outer lid 44. Because of this hole, the air can pass through between outside of the fluid container and the air vents 43a formed in the inner lid 43.

The piston member 42 may require a configuration allowing the piston member 42 to travel smoothly inside the cylinder member while achieving high liquidtightness. A configuration of the piston member 42 for serving this purpose is described in detail later.

In this fluid container, by reciprocating the piston member 42 up and down by pressing the nozzle head 20 switched over to the open position, a fluid stored inside the fluid-storing portion 40 is discharged from the nozzle head 20 by the action of the fluid discharge pump 10 described in detail later. As a fluid amount inside the fluid-storing portion 40 decreases, the piston member 42 travels toward the nozzle head 20 inside the cylinder member 41 as shown in FIG. 2.

Figure 3:
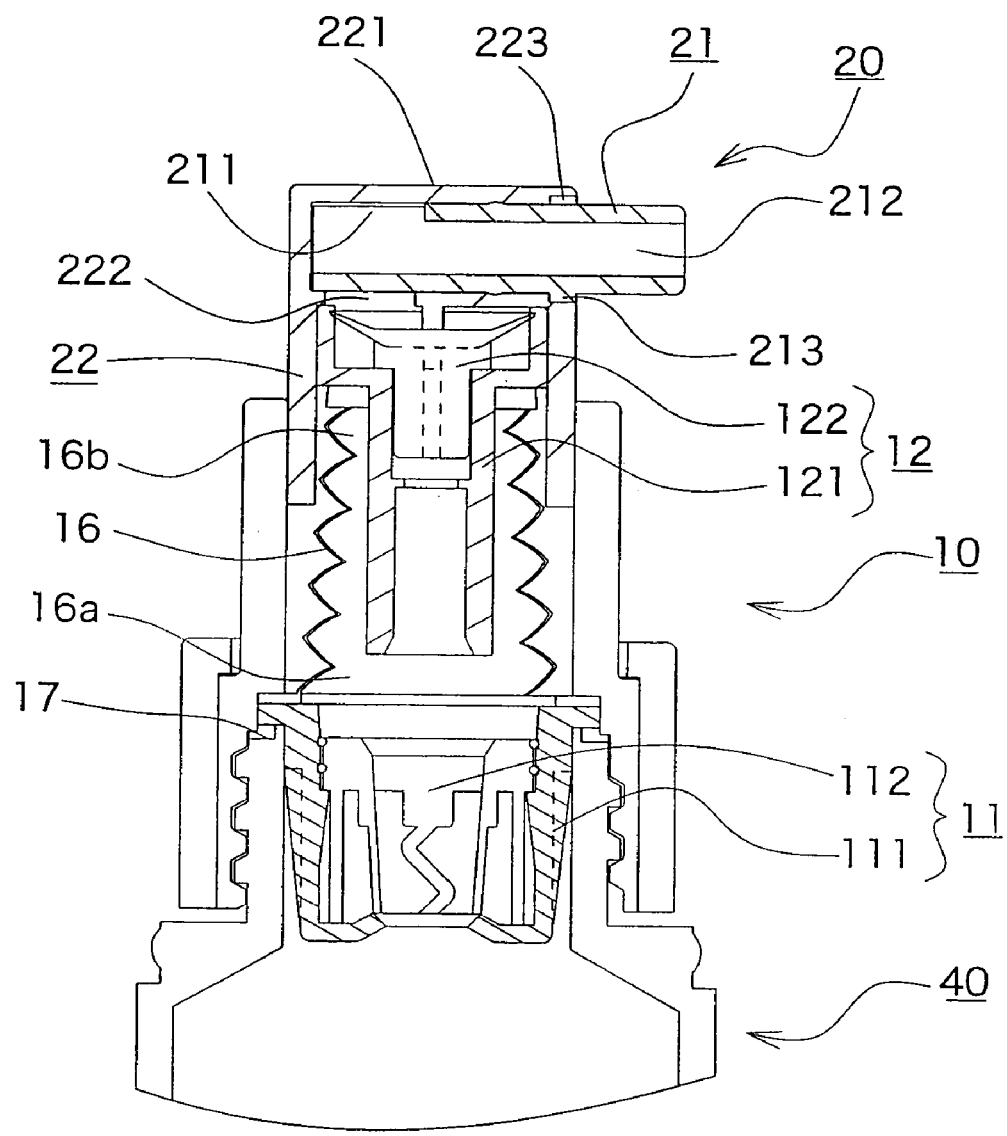
FIG. 3 is an enlarged longitudinal view of the fluid discharge pump 10 the nozzle head 20 in the closed position, wherein an inflow portion 211 is not communicated with an opening portion 222.
Figure 4:
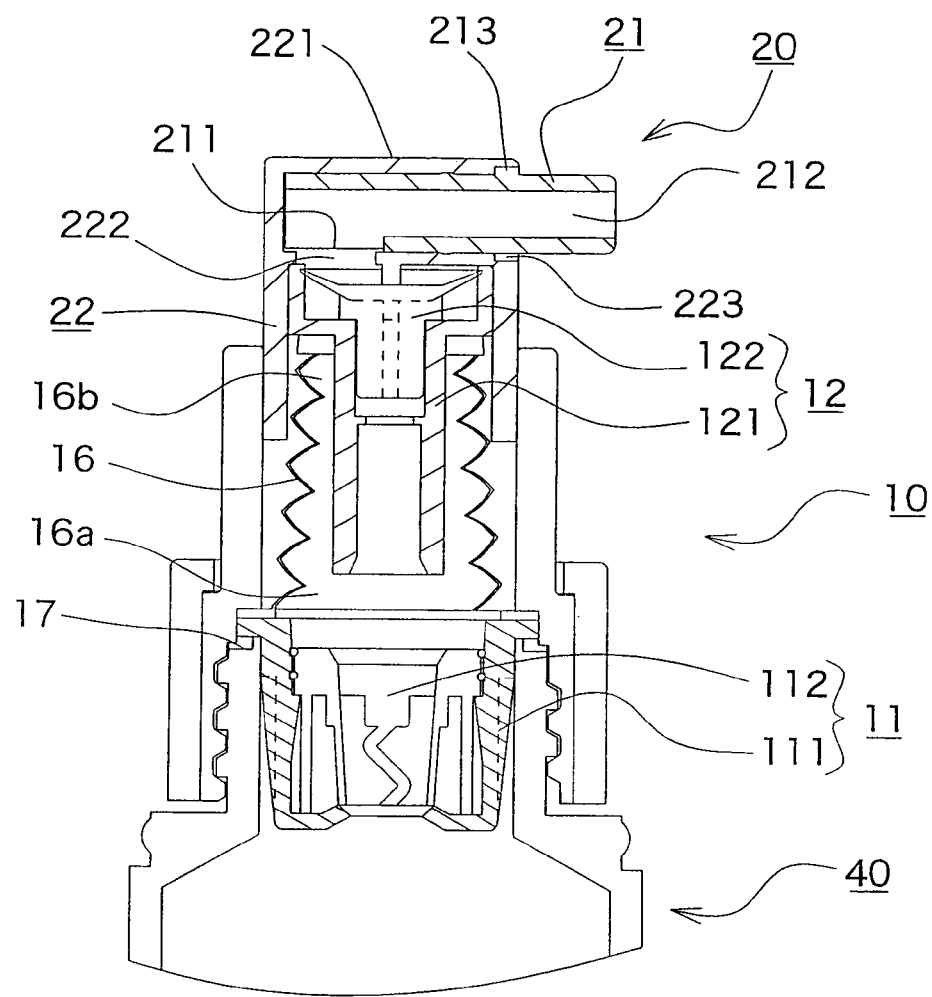
FIG. 4 is a longitudinal view of the fluid discharge pump 10 the nozzle head 20 in the open position, wherein the inflow portion 211 is communicated with the opening portion 222.

FIG. 3 is a longitudinal cross section showing the fluid discharge pump 10 and the nozzle head 20 in the closed position; FIG. 4 is a longitudinal cross section showing he fluid discharge pump 10 and the nozzle head 20 in the open position.

The fluid discharge pump 10 may comprise a resinous bellows member 16 having an inflow opening 16a and an outflow opening 16b, a resinous inflow valve mechanism 11 fixed in the inflow opening 16b of the bellows member 16, and the resinous outflow valve mechanism 12 fixed in the outflow opening 16b of the bellows member. The inflow valve mechanism 11 here may be used for letting a fluid stored inside the fluid-storing portion 40 flow into the fluid discharge pump 10 as the bellows member 16 stretches; the outflow valve mechanism 12 may be used for letting the fluid having flowed into the fluid discharge pump flow out to the nozzle head as the bellows member 16 folds up.

Figure 5A:
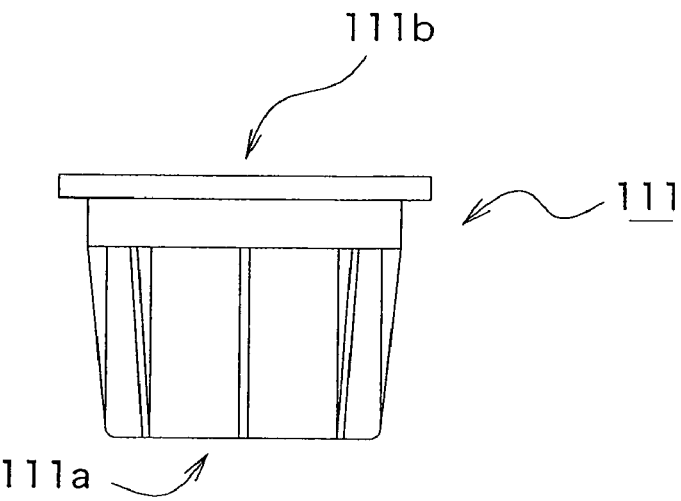
FIGS. 5(*a*)-(*c*) are a side view, cross sectional view, and bottom view, respectively, showing an inflow valve seat member 111 in an embodiment comprising an inflow valve mechanism 11 in the fluid discharge pump 10.
Figure 5B:
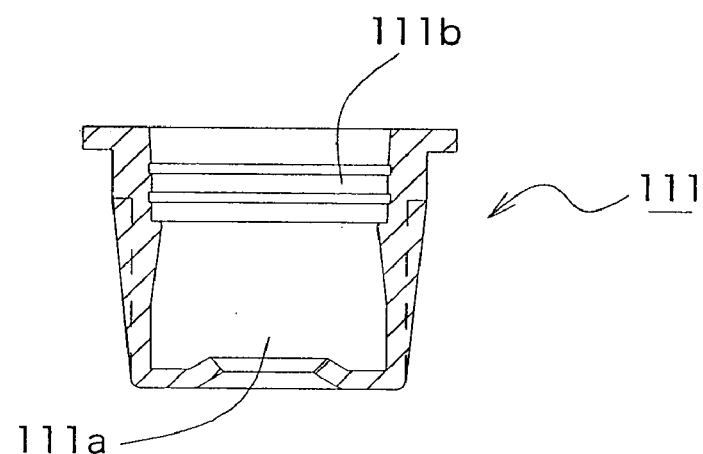
Figure 5C:
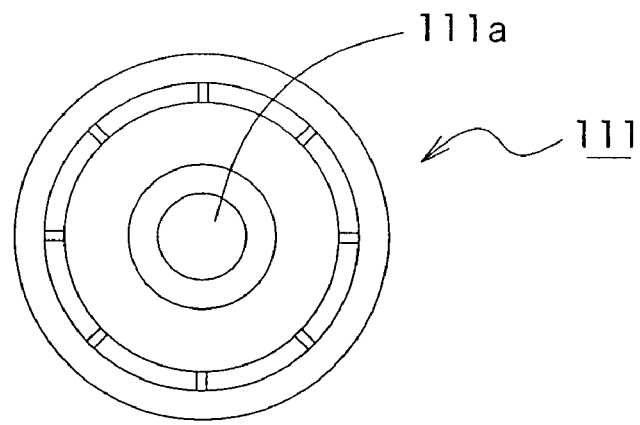
Figure 6A:
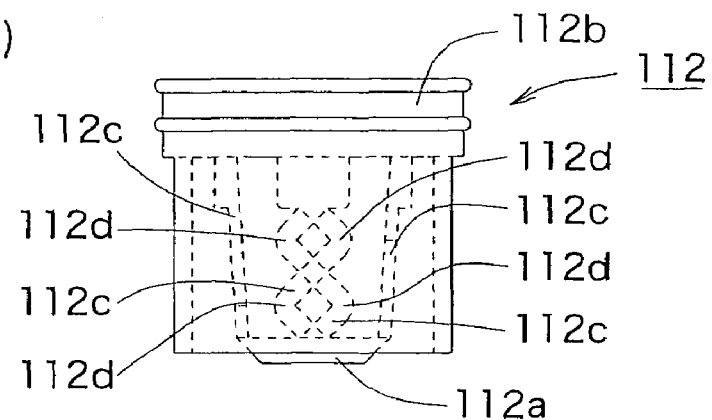
FIGS. 6(*a*)-(*c*) are a side view, cross sectional view, and bottom view, respectively, showing an inflow valve member 112 in an embodiment comprising the inflow valve mechanism 11 in the fluid discharge pump 10.
Figure 6B:
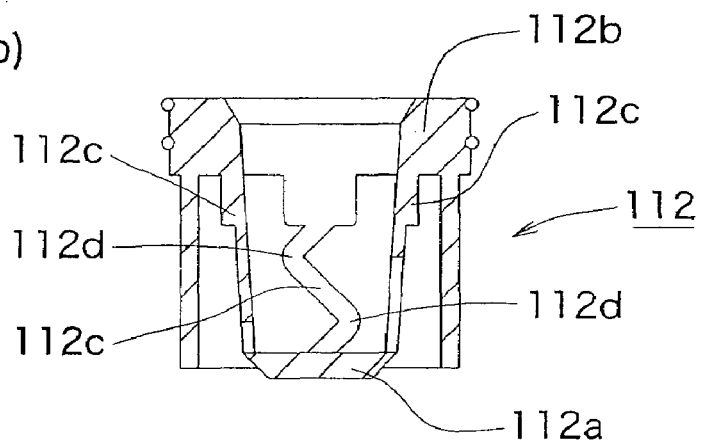
Figure 6C:
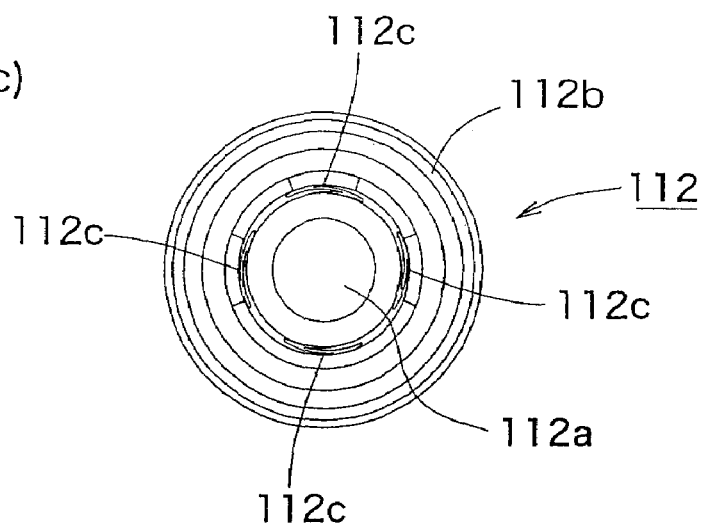

FIG. 5(a) is a front view of an inflow valve seat member 111 comprising the inflow valve mechanism 11 in the fluid discharge pump 10; FIG. 5(b) is a lateral cross section of the same; FIG. 5(c) is a backside view of the same. FIG. 6(a) is a front view of the inflow valve member 112 comprising the inflow valve mechanism 11 in the fluid discharge pump 10; FIG. 6(b) is a cross section of the same; FIG. 6(c) is a backside view of the same.

As shown in FIGS. 5(a)-(c), the inflow valve seat member 111 may comprise an opening portion 111a for letting a fluid inside the fluid-storing portion 40 flow in, and a joined portion 111b to be joined with the inflow valve member 112 described later.

As shown in FIGS. 6(a)-(c), the inflow valve member 112 may comprise a valve body 112a having a shape corresponding to a shape of the opening portion 111a of the inflow valve seat member 111, a supporting portion 112b fixed in the joined portion 111b of the inflow valve seat member 111, and four coupling portions 112c for coupling the valve body 112a and the supporting portion 112b. The respective four coupling portions 112c may have one pair of flexions 112d, hence adequate flexibility is provided.

Figure 7A:
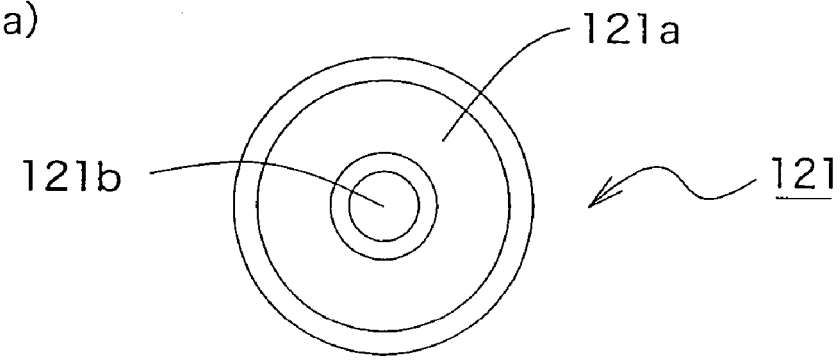
FIGS. 7(a)-(c) are a top view, cross sectional view, and bottom view, respectively, showing an outflow valve seat member 121 in an embodiment comprising the outflow valve mechanism 12 in the fluid discharge pump 10.
Figure 7B:
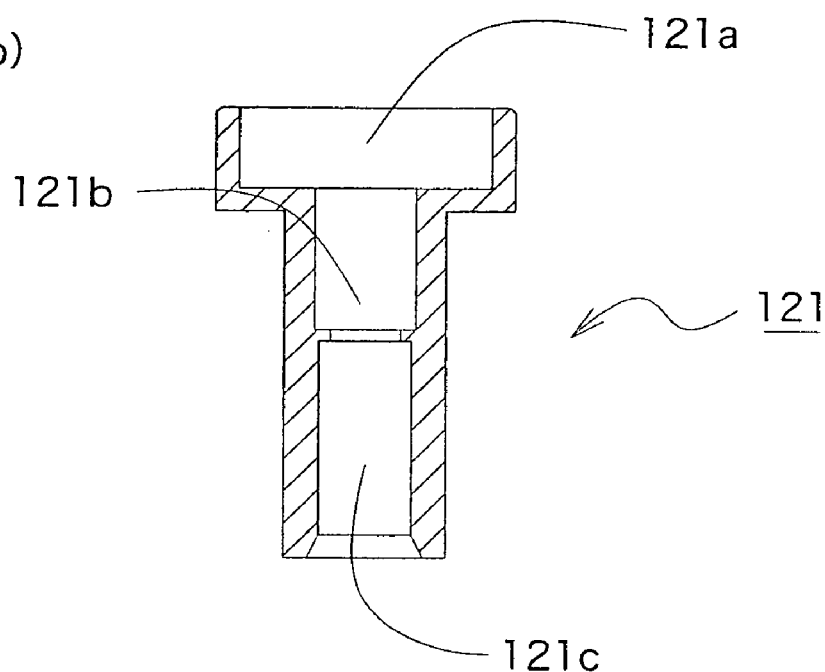
Figure 7C:
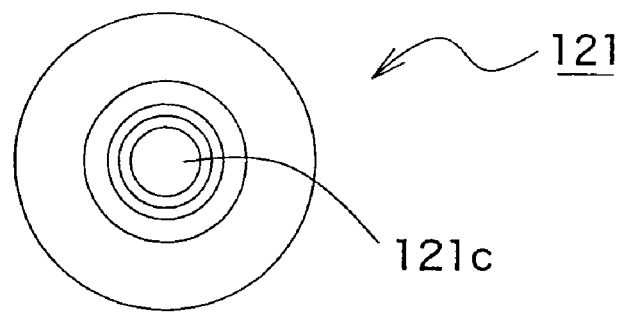
Figure 8A:
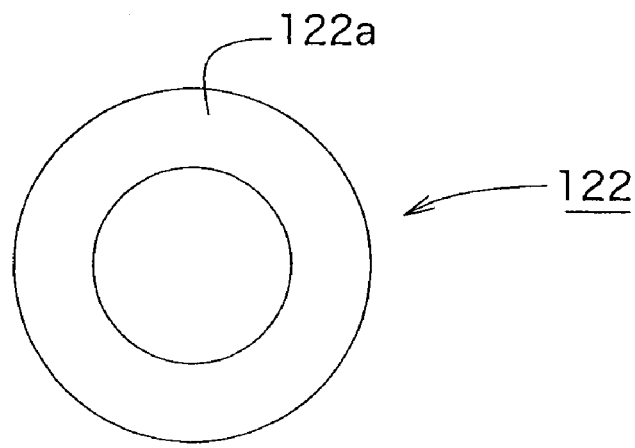
FIGS. 8(a)-(c) are a top view, side view, and bottom view, respectively, showing an outflow valve member 122 in an embodiment comprising the outflow valve mechanism 12 in the fluid discharge pump 10.
Figure 8B:
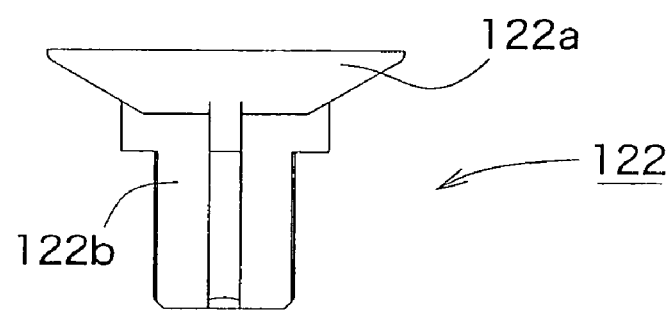
Figure 8C:
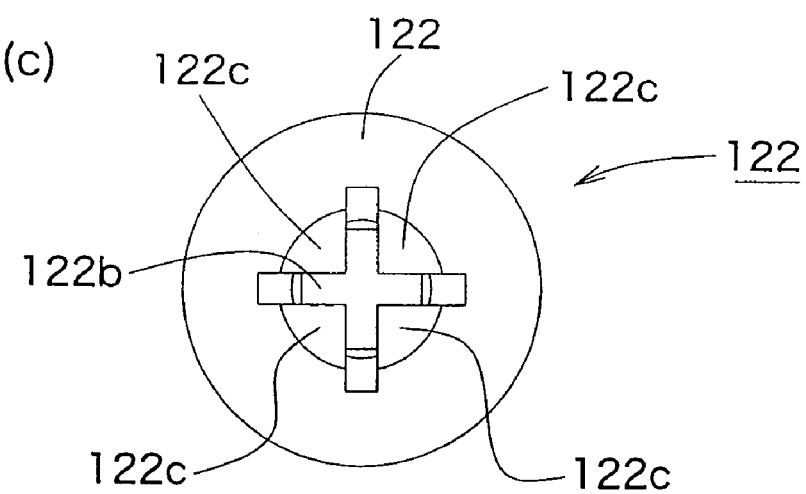

FIG. 7(a) is a plane view showing an outflow valve seat member 121 comprising an outflow valve mechanism 12 in the fluid discharge pump 10; FIG. 7(b) is a lateral view of the same; FIG. 7(c) is a backside view of the same. FIG. 8(a) is a plane view showing an outflow valve member 122 comprising then outflow valve mechanism 12 in the fluid discharge pump 10; FIG. 8(b) is a lateral view of the same; FIG. 8(c) is a backside view of the same.

As shown in FIGS. 7(a)-(c), the outflow valve seat member 121 may comprise an opening portion 121a, a joined portion 121b joined with the outflow valve member 122 described later, and an inflow portion 121c for letting a fluid inside the fluid discharge pump 10 flow in.

As shown in FIGS. 8(a)-(c), the outflow valve member 122 may comprise a nearly dish-shaped flexible valve portion 121a contacting an inner surface of the opening portion 121a of the outflow valve seat member 121, and a base portion 122b joined with the joined portion 121b of the outflow valve seat member 12. In the base portion 122b, a passage groove 122c for letting the fluid flow in is formed.

Figure 9:
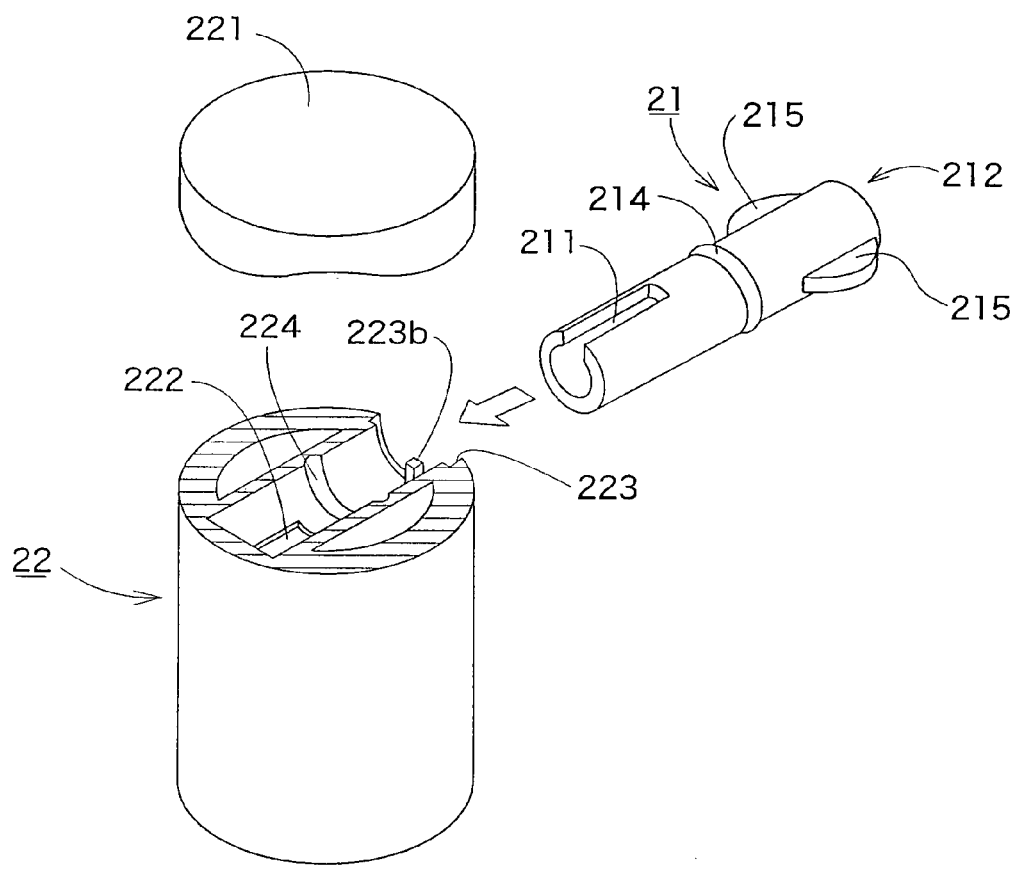
FIG. 9 is an explanatory view showing dismantling the nozzle head 20 in a closed position in an embodiment.
Figure 10:
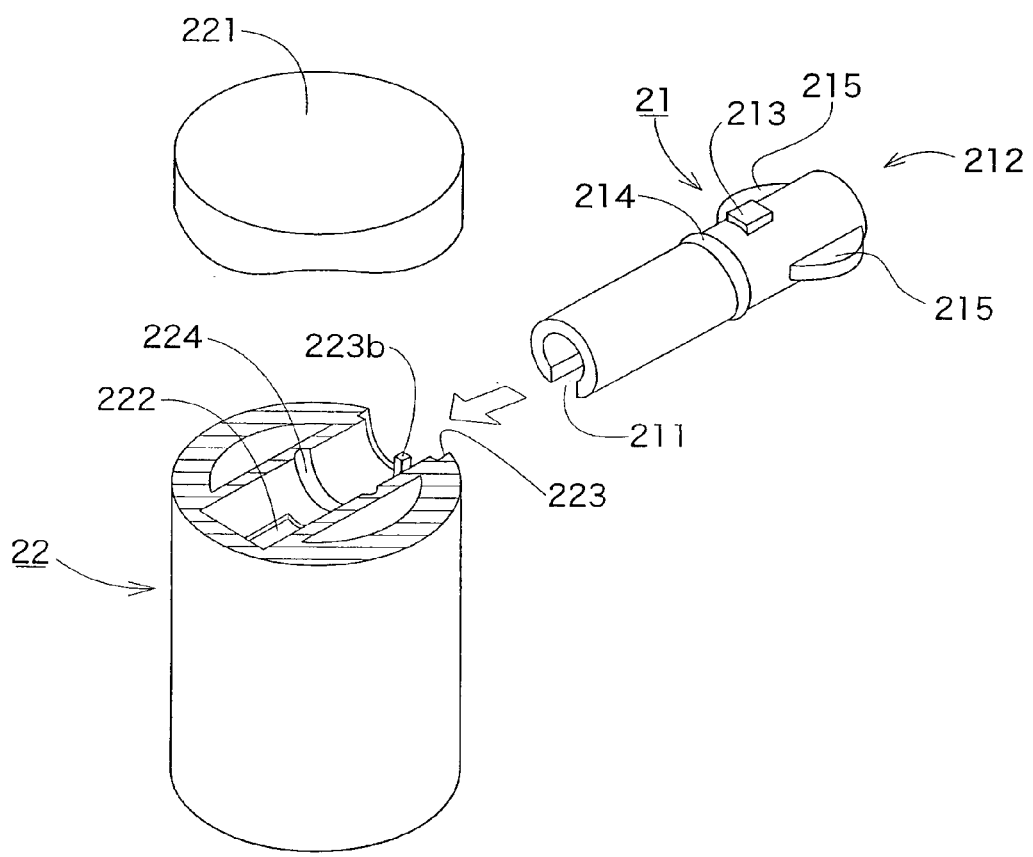
FIG. 10 is an explanatory view showing dismantling the nozzle head 20 in an open position in an embodiment.

FIG. 9 is an explanatory cutaway view showing a portion of the nozzle head 20 in the closed position; FIG. 10 is an explanatory cutaway view showing a portion of the nozzle head 20 in the open position.

The nozzle head 20 may comprise a tubular member 21 and a guiding member 22. The tubular member 21 may have an inflow portion 211 for letting the fluid flow in from the outflow valve mechanism 12 in the fluid discharge pump described later, an outflow portion 212 for letting the fluid having flowed in from the inflow portion 211 flow out, a convex portion 213 guided by the guiding member 22, and an engaging portion 214.

The guiding member 22 may have a pushing portion 221, an opening portion 222 communicated with the inflow portion 211 of the tubular member 21 in an open position, a guiding portion 223 guiding a switchover between an open position and a closed position of the tubular member 21 described later, and a groove portion 224 having a shape corresponding to the engaging portion 214 of the tubular member 21.

The engaging portion 214 of the tubular member 21 may be fitted in the groove portion 224 in the guiding member 22. By this, the tubular member 21 can be supported rotatably on its shaft center against the guiding member.

With the above-mentioned configuration provided, it is possible to switch the nozzle head 20 between the open position and the closed position: In the open position, the inflow portion 211 of the tubular member 21 and the opening portion 222 of the guiding member 22 are communicated, and fluid passage between the inflow portion 211 of the tubular member 21 and the outflow valve mechanism described later is enabled; in the closed position, fluid passage between the inflow portion 211 and the outflow valve mechanism 12 is shut off. Consequently, when the nozzle head 20 is switched over to the closed position, it becomes possible to fully prevent leaking out of the fluid from the fluid container.

Figure 11:
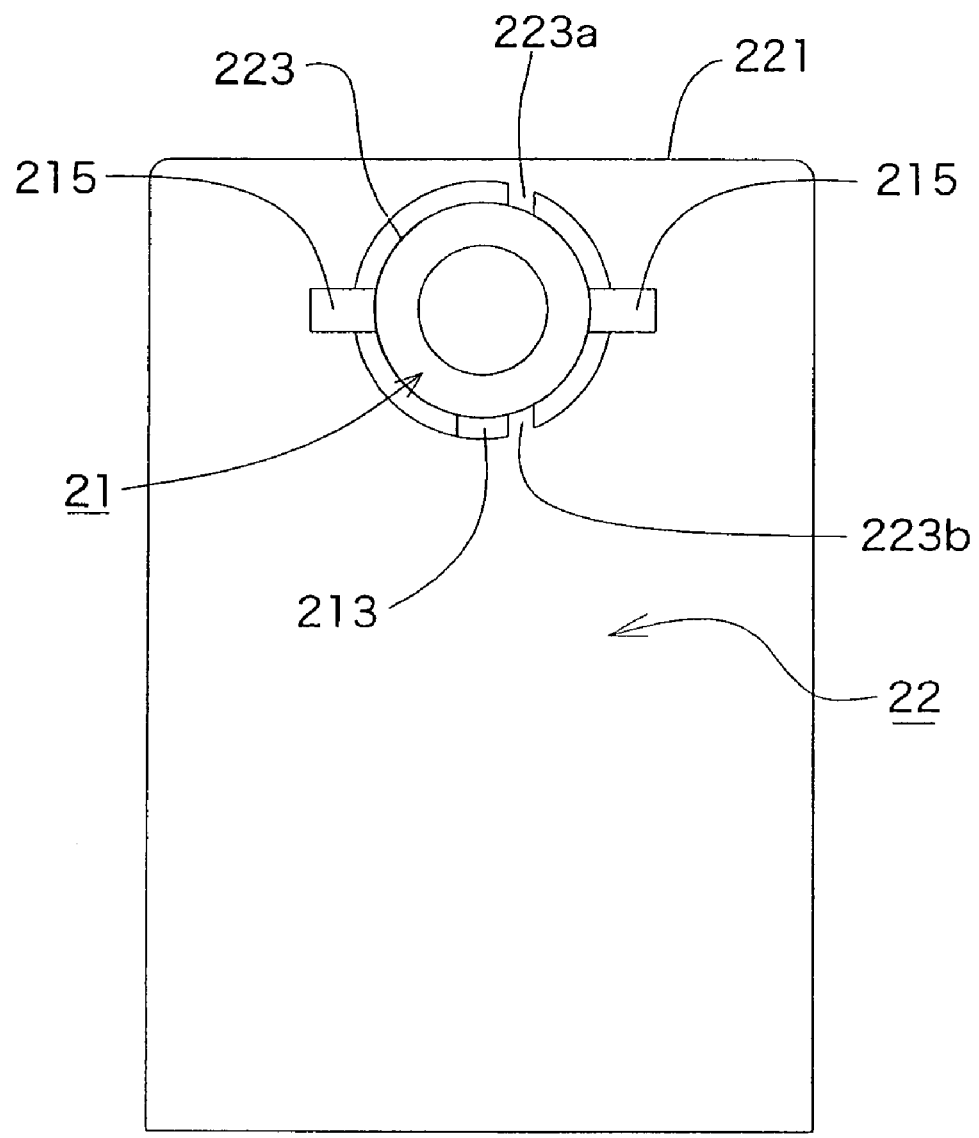
FIG. 11 is a front view of the nozzle head 20 in the closed position.
Figure 12:
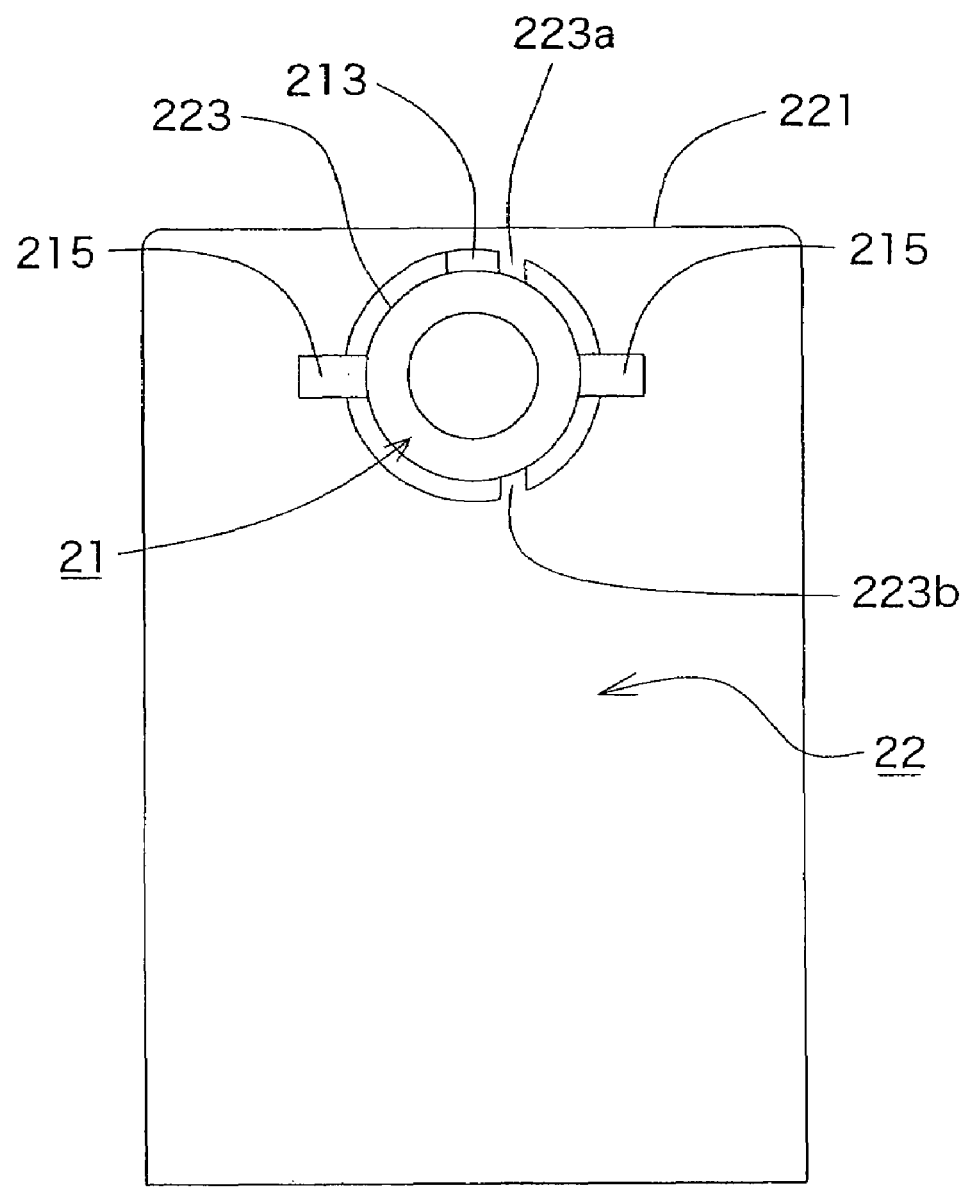
FIG. 12 is a front view of the nozzle head 20 in the open position.

FIG. 11 is a front view of the nozzle head 20 in the closed position; FIG. 12 is a front view of the nozzle head 20 in the open position.

Switching over of the nozzle head 20 between the open position and the closed position may be achieved by rotating the tubular member 21 on its shaft center against the guiding member 22. At this time, the convex portion 21 of the tubular member 21 may be guided by the guiding portion 223 of the guiding member 22.

Additionally, the guiding member 22 may have a first regulating portion 223a and a second regulating portion 223b. The first regulating portion 223a stops a rotation of the tubular member by contacting the convex portion 213 of the tubular member 21 in the open position; the second regulating portion stops a rotation of the tubular member by contacting the convex position 213 of the tubular member 21 in the closed position. By these first regulating portion 223a and second regulating portion 223b, a switchover between the open position and the closed position can be achieved easily.

Fluid discharge actions in the above-mentioned fluid container are described below.

Figure 13:
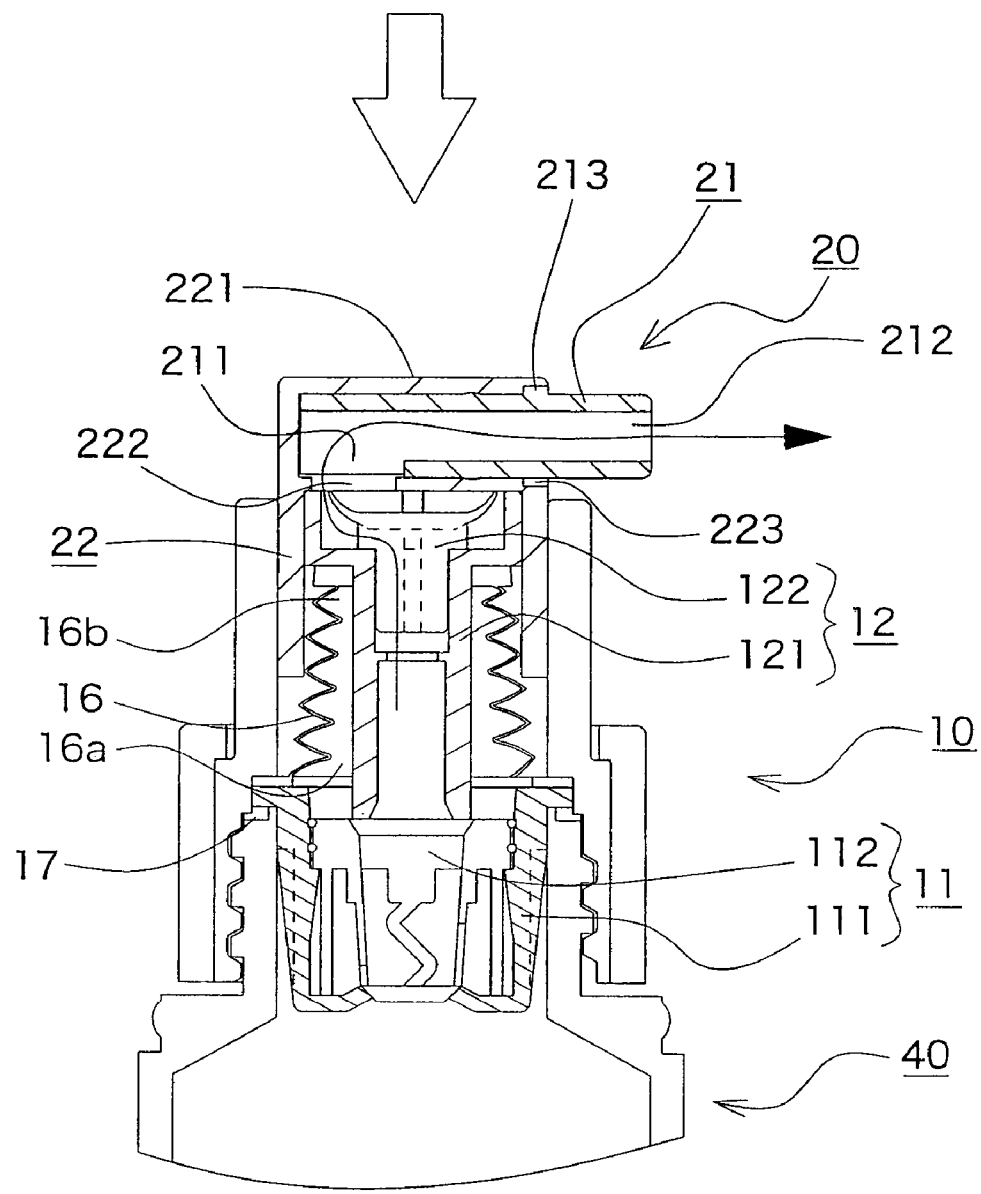
FIG. 13 is an enlarged longitudinal view showing the fluid discharge pump 10 and the nozzle head 20 in the open position, where the nozzle head is pressed.
Figure 14:
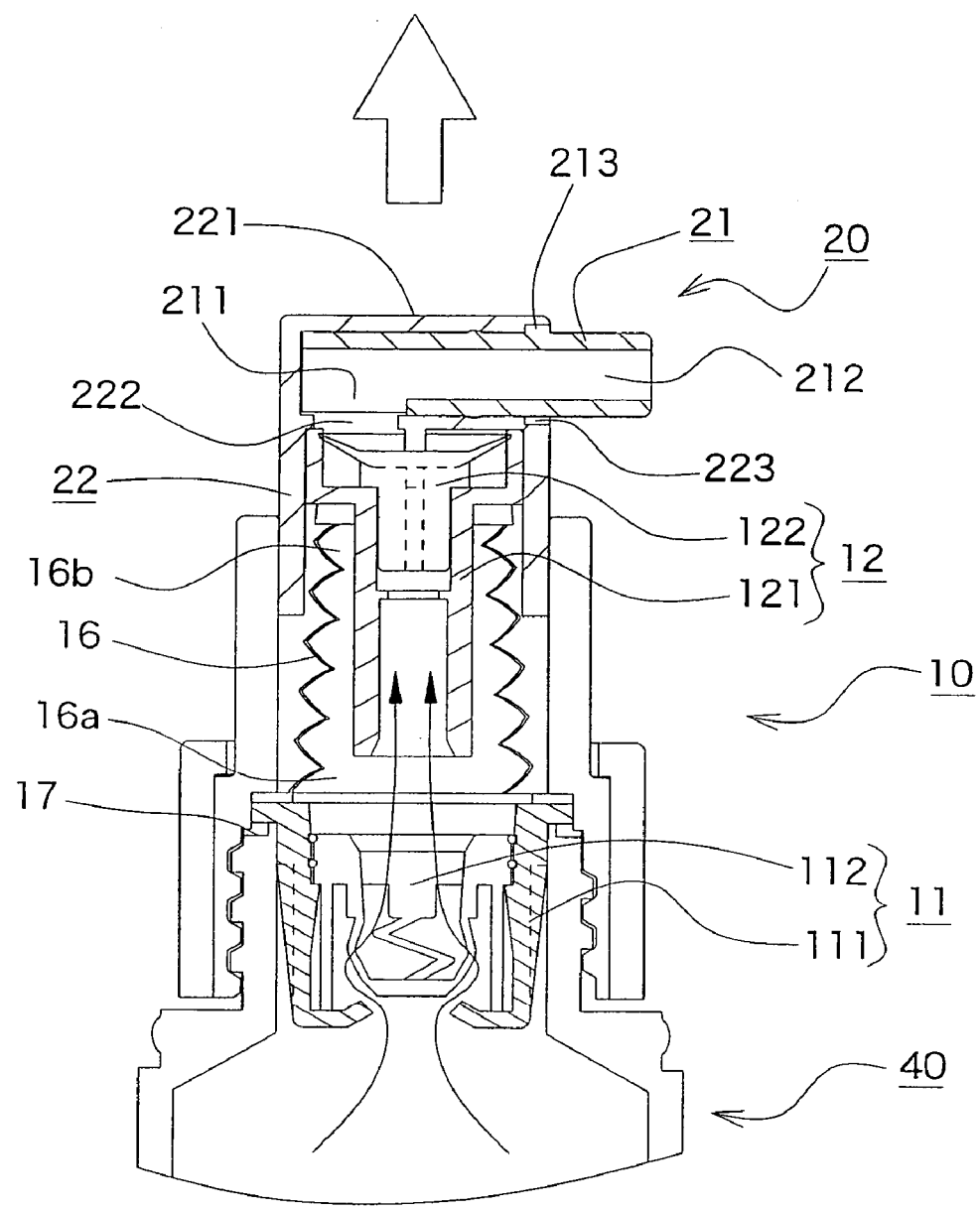
FIG. 14 is an enlarged longitudinal view showing the fluid discharge pump 10 and the nozzle head 20 in the open position, wherein the nozzle head is released.

FIGS. 13 and 14 are longitudinal cross sections showing the fluid discharge pump 10 and the nozzle head 20 in the open position. Of these, FIG. 13 shows a position in which, with the pushing portion 221 in the nozzle head 20 being pressed, the bellows member 16 is deforming to a folded-up position in which it holds a relatively small amount of fluid from a stretched position in which it holds a relatively large amount of fluid inside it; FIG. 14 shows a position in which, with a pressure applied to the pushing portion 221 in the nozzle head 20 removed, the bellows member 16 is deforming back to the stretched position again.

As shown in FIG. 13, when the pushing portion 221 in the nozzle head 20 is pressed, a capacity of the bellows member 16 may reduce and inside the fluid discharge pump 10 may be pressurized. By this, the valve body 112a of the inflow valve member 112 can be disposed in a position in which it contacts the opening portion 111a of the inflow valve seat member 111 and the opening portion 11a is closed; simultaneously, the valve body 122a of the outflow valve member 122 can be disposed in a position in which it separates from the opening portion 121a of the outflow valve seat member 121 and the opening portion 121a is open. Consequently, the fluid inside the fluid discharge pump 10 flows out to the outflow portion 212 of the nozzle head 20 in the open portion.

As shown in FIG. 14, when a pressure applied to the pushing portion 221 in the nozzle head 20 is removed, a capacity of the bellows member 16 may expand by the resilience of the bellows member 16 and inside the fluid discharge pump may be depressurized. By this, the valve body 112a of the inflow valve member 112 may be disposed in a position in which it separates from the opening portion 111a of the inflow valve seat member; simultaneously, the valve body 122a of the outflow valve member 122 may be disposed in a position in which it contacts the opening portion 121a of the outflow valve seat member 121. Consequently, the fluid stored inside the fluid-storing portion 40 can flow into the fluid discharge pump 10.

A configuration of the fluid-storing portion 40 is described below.

The cylinder member 41 used for this fluid-storing portion 40 may be made of an injection molded resin. Consequently, as shown in FIGS. 1 and 2, for production process convenience, etc., a tip of the cylinder member 41 may have a tapered shape.

Figure 15A:
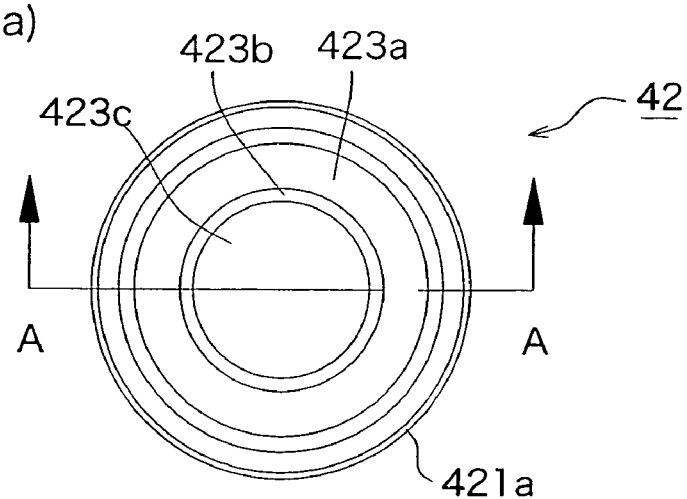
FIGS. 15(a)-(c) are a top view, side view, and cross sectional view of A-A line, respectively, showing a piston member 42 in an embodiment comprising the fluid-storing portion 40.
Figure 15C:
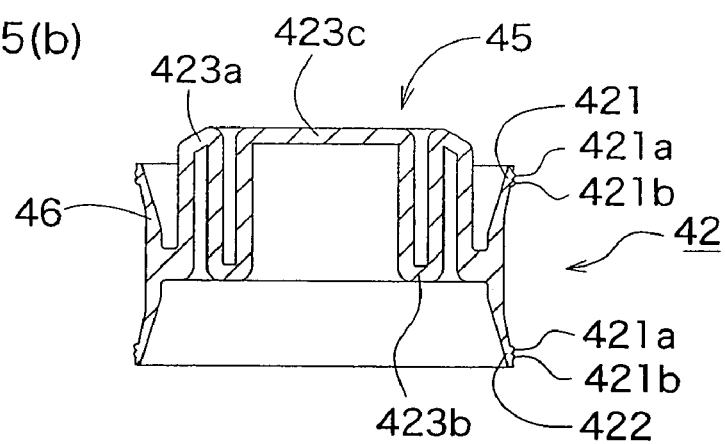
Figure 15B:
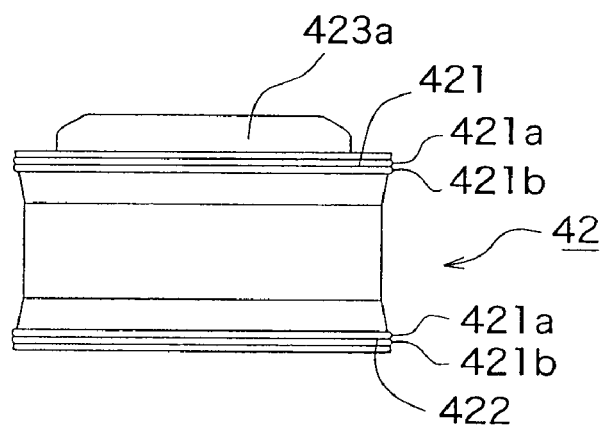

FIG. 15(a) is a plane view showing the piston member 42 comprising the fluid-storing portion 40; FIG. 15(b) is a front view of the same; FIG. 15(c) is a cross section showing an A-A section in FIG. 15(a).

On the upper side of this piston member 42, a fluidtight portion 421 contacting an inner circumference of the cylinder member 41 may be formed; on the underside of the piston member 42, a fluidtight portion 422 contacting an inner circumference of the cylinder member 41 may be formed. In other words, on an outer peripheral surface of the piston member 42, a pair of fluidtight portions 421, 422 respectively contacting an inner circumference of the cylinder member 41 may be disposed apart from each other at a certain distance.

A contacting portion in the fluidtight portion 421, which contacts an inner circumference of the cylinder member 41, may comprise a pair of convex portions 421a, 421b disposed adjacently. A contacting portion in the fluidtight portion 422, which contacts an inner circumference of the cylinder member 41, may comprise a pair of convex portions 422a, 422b disposed adjacently.

In this piston member 42, by the action of a pair of fluidtight portions 421, 422, which are disposed apart from each other at a certain distance, the shaft center of the piston member 42 and the shaft center of the cylinder member 41 always can be brought in line regardless of a direction of stress applied to the piston member 42. Consequently, it becomes possible for the piston member 42 to smoothly travel inside the cylinder member 41.

Additionally, in the piston member 42, concentric flexions 423a, 423b, 423c with the fluidtight portions 421, 422, which serve as contacting portions contacting the inner circumference of the cylinder member 41, may be formed in a plane perpendicular to a traveling direction of the piston member inside the cylinder member 41. The piston member 42, therefore, may have momentum from the central portion to an outer perimeter in a plane perpendicular to a traveling direction of the piston member inside the cylinder member 41 and may be configured to be capable of expanding and contracting according to a shape of the inner circumference of the cylinder member 41. Consequently, in the case of the cylinder member 41 having a tapered shape toward a nozzle direction or the cylinder member 41 having a low accuracy, i.e., having an uneven internal surface, it becomes possible to secure adequate liquidtightness for the cylinder member 41 and the piston member 42, not by altering an inside diameter of the cylinder 41.

Furthermore, because more flexions are formed above the central portion of the piston member 42 than below the central portion, as shown in FIG. 2, it becomes possible to get relatively a small amount of the fluid remaining inside the fluid-storing portion 40 when the piston member 42 travels to the most elevated position inside the cylinder member 41.

FIGS. 16(a)-(c) are explanatory views each showing the piston member 42' in an alternative embodiment. While three flexions 423a, 423b, 423c are formed in the piston member 42 in the fluid container according to Embodiment 1, five flexions 423a, 423b, 423'c, 423d, 423e also can be formed in this embodiment as shown in FIGS. 16(a)-(c). Additionally, the number of flexions formed can be other than five, or it can be a single one.

Figure 17:
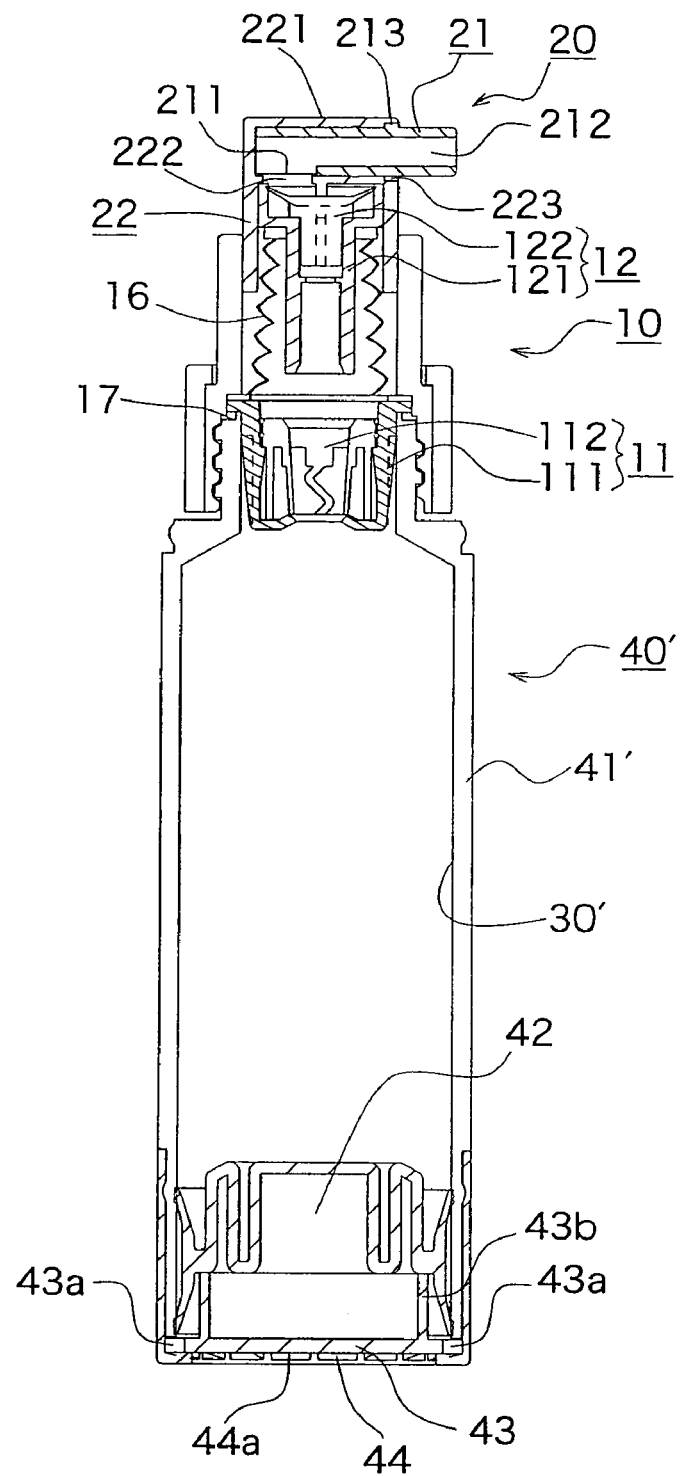
FIG. 17 is a longitudinal view showing a fluid container according to Embodiment 2 of the present invention, where a piston is at the bottom of the container.
Figure 18:
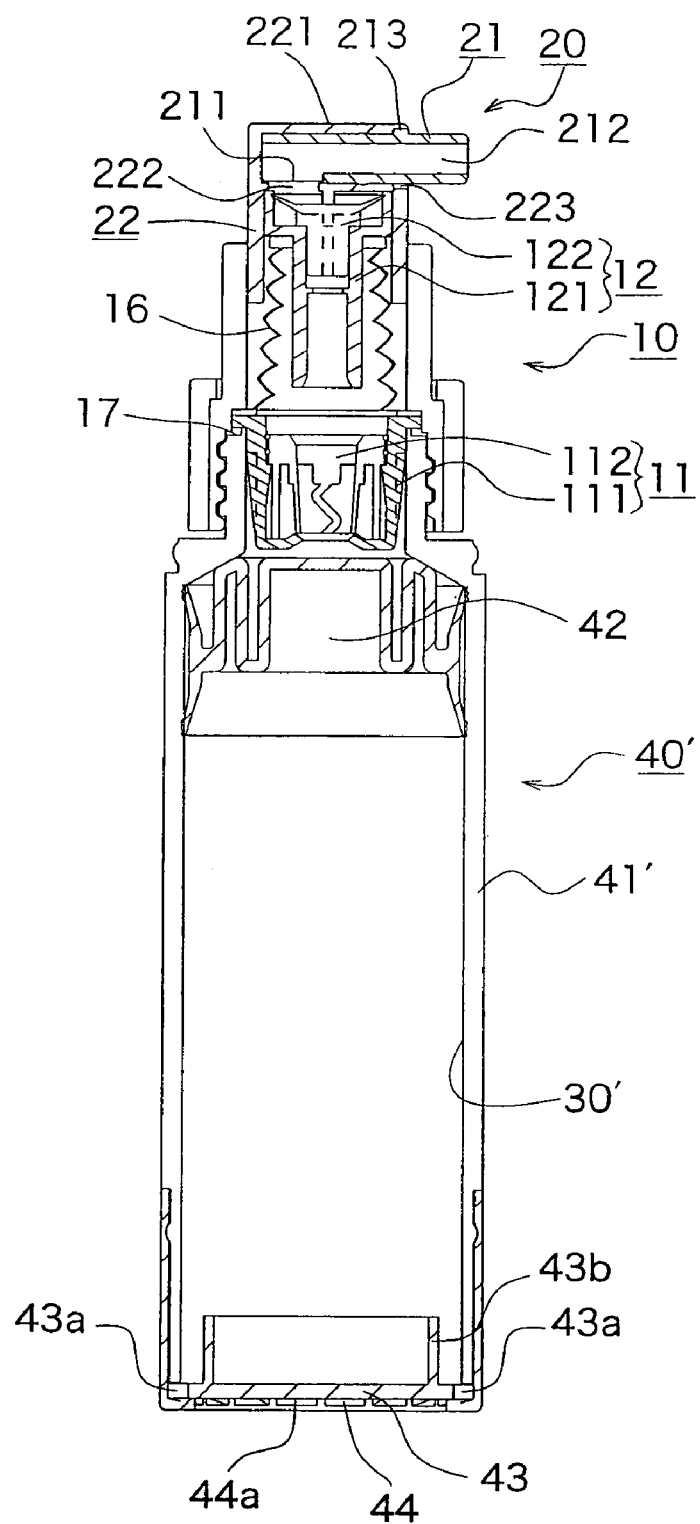
FIG. 18 is a longitudinal view showing the fluid container according to Embodiment 2 of the present invention, wherein the piston is at the top of the container.

FIGS. 17 and 18 are longitudinal cross sections showing the fluid container according to a further alternative embodiment (Embodiment 2). While a cylinder member 41 in the fluid container according to the embodiments previously described has a tapered inner surface 30, even when the cylinder member having a non-tapered inner surface 30' as shown as a cylinder member 41' of a container 40' in FIGS. 17 and 18 is used, the piston member 42 shown in FIGS. 15(a)-(c) and 16(a)-(c) also can be used.

According to an embodiment of the present invention, when the piston comprises an elastic member in which a concentric flexion with an outer perimeter is formed in a plane perpendicular to a traveling direction of the piston inside the cylinder and has momentum from the central portion in an outer peripheral direction, it becomes possible to secure airtightness even when a cylinder diameter changes.

According to another embodiment of the present invention, when in the fluid container possessing a fluid discharge pump for discharging a fluid stored inside a fluid-storing portion from a nozzle head disposed on the upper side of the fluid-storing portion by pressing the nozzle head, the fluid-storing portion possesses a cylinder member, and a piston engaged inside the cylinder member, which comprises an elastic member in which a concentric flexion with an outer perimeter is formed in a plane perpendicular to a traveling direction of the piston inside the cylinder member, and has momentum from the central portion in an outer peripheral direction, it becomes possible to secure airtightness even when a cylinder diameter changes.

According to still another embodiment of the present invention, when the cylinder member has a tapered shape toward the nozzle head, throughput of the cylinder member is improved; simultaneously it becomes possible to secure airtightness even when a cylinder diameter changes.

According to yet another embodiment of the present invention, when within a contacting surface of the piston, which contacts the cylinder, more flexions are formed in a tapered direction of the cylinder member, it becomes possible to get relatively a small amount of the fluid remaining inside the fluid-storing portion 40 when the piston member 42 travels to the most elevated position inside the cylinder member 41.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A piston adapted to be engaged inside a cylindrical container, constituted by an elastic member comprising:

a sliding member having an upper fluidtight portion and a lower fluidtight portion, both of which fluidtightly and slidably contact an inner wall of the cylindrical container, wherein the upper and lower fluidtight portions each have at least one annular convex bump portion; and a support member having an upper concentric flexion and a lower concentric flexion to urge the sliding member against the inner wall of the cylindrical container, said lower concentric flexion being disposed between the upper fluidtight portion and the lower fluidtight portion with respect to an axis of the piston and being disposed closer to the axis of the piston than is the upper concentric flexion, wherein the lower concentric flexion is disposed on a plane perpendicular to the axis of the piston, which is positioned nearly half way between the upper fluidtight portion and the lower fluidtight portion.

2. The piston according to claim 1, wherein the upper concentric flexion is disposed above the upper fluidtight portion.

3. The piston according to claim 1, wherein each of the upper and lower concentric flexions is disposed on a plane perpendicular to an axis of the piston.

4. The piston according to claim 1, wherein the support member further has at least another concentric flexion.

5. The piston according to claim 4, wherein the other concentric flexion is arranged on a plane perpendicular to an axis of the piston between the upper concentric flexion and the lower concentric flexion with respect to respective planes perpendicular to the axis of the piston.

6. The piston according to claim 1, wherein the sliding member and the supporting member are configured to provide at least 4% elastic deformation evenly in a radial direction.

7. A piston adapted to be engaged inside a cylindrical container, constituted by an elastic member comprising:

a sliding member having an upper fluidtight portion and a lower fluidtight portion, both of which fluidtightly and slidably contact an inner wall of the cylindrical container, wherein the upper and lower fluidtight portions each have at least one annular convex bump portion; and a support member having an upper flexion and a lower flexion to urge the sliding member against the inner wall of the cylindrical container, each of the upper and lower flexions being disposed on a plane perpendicular to an axis of the piston, said lower flexion being disposed between the upper fluidtight portion and the lower fluidtight portion with respect to an axis of the piston and being disposed closer to the axis of the piston than is the upper flexion, wherein the lower flexion is disposed nearly half way between the upper fluidtight portion and the lower fluidtight portion.

8. The piston according to claim 7, wherein a cross section of the cylindrical container, the upper flexion, and the lower flexion have homologous shapes on a plane perpendicular to the axis.

9. The piston according to claim 8, wherein a distance between the upper flexion and the axis is greater than a distance between the lower flexion and the axis.

10. The piston according to claim 7, wherein the upper flexion is disposed above the upper fluidtight portion.

11. The piston according to claim 7, wherein the support member further has at least another homologous flexion inward of the upper and lower flexions.

12. The piston according to claim 11, wherein the other flexion is arranged between the upper flexion and the lower flexion with respect to respective planes perpendicular to the axis of the piston.

13. The piston according to claim 7, wherein the sliding member and the supporting member are configured to provide at least 4% elastic deformation evenly in a radial direction.

14. A fluid container comprising:

a fluid-storing portion for storing a fluid therein;

the piston of claim 1 engaged inside the fluid-storing portion, said piston serving as a bottom of the fluid-storing portion;

a nozzle head for discharging the fluid disposed on an upper side of the fluid-storing portion; and a fluid discharge pump for discharging the fluid stored inside the fluid-storing portion from the nozzle head when the nozzle head is pressed.

15. The fluid container according to claim 14, wherein the fluid-storing portion is cylindrical and has an inner wall tapered toward the nozzle head.

16. The fluid container according to claim 15, wherein the piston has at least another concentric flexion, said other concentric flexion being arranged inward of the upper and lower concentric flexions with respect to an axis of the piston and between the upper and lower concentric flexions with respect to respective planes perpendicular to the axis of the piston.

17. The fluid container according to claim 14, wherein the lower concentric flexion is arranged on a plane perpendicular to an axis of the piston, which is positioned nearly halfway between the upper and lower fluidtight portions.

18. The fluid container according to claim 14, wherein the upper concentric flexion is arranged above the upper fluidtight portion.

19. A fluid container comprising:

a fluid-storing portion for storing a fluid therein;

the piston of claim 7 engaged inside the fluid-storing portion, said piston serving as a bottom of the fluid-storing portion;

a nozzle head for discharging the fluid disposed on an upper side of the fluid-storing portion; and a fluid discharge pump for discharging the fluid stored inside the fluid-storing portion from the nozzle head when the nozzle head is pressed.

20. The fluid container according to claim 19, wherein the fluid-storing portion is cylindrical and has an inner wall tapered toward the nozzle head.

21. The fluid container according to claim 20, wherein the piston has at least another flexion, said other flexion being arranged inward of the upper and lower flexions with respect to an axis of the piston and between the upper and lower flexions with respect to respective planes perpendicular to the axis of the piston.

22. The fluid container according to claim 19, wherein the lower flexion is arranged nearly halfway between the upper and lower fluidtight portions.

23. The fluid container according to claim 19, wherein the upper flexion is arranged above the upper fluidtight portion.

24. The fluid container according to claim 14, wherein the fluid-storing portion has an inner diameter which changes with respect to an axis of the container.

25. The fluid container according to claim 19, wherein the fluid-storing portion has an inner diameter which changes with respect to an axis of the container.

* * * * *